Mar. 27, 1923.
J. W. ELLENWOOD
1,450,146
COMBINED FISH GRADING AND CLEANING DEVICE
Filed Oct. 30, 1922     2 sheets-sheet 1
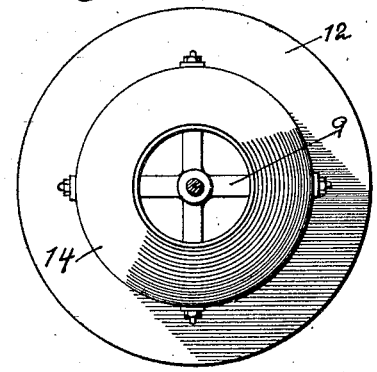
Fig. 1.
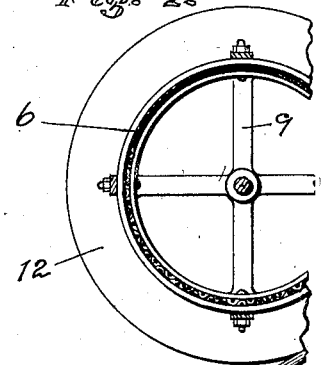
Fig. 2.
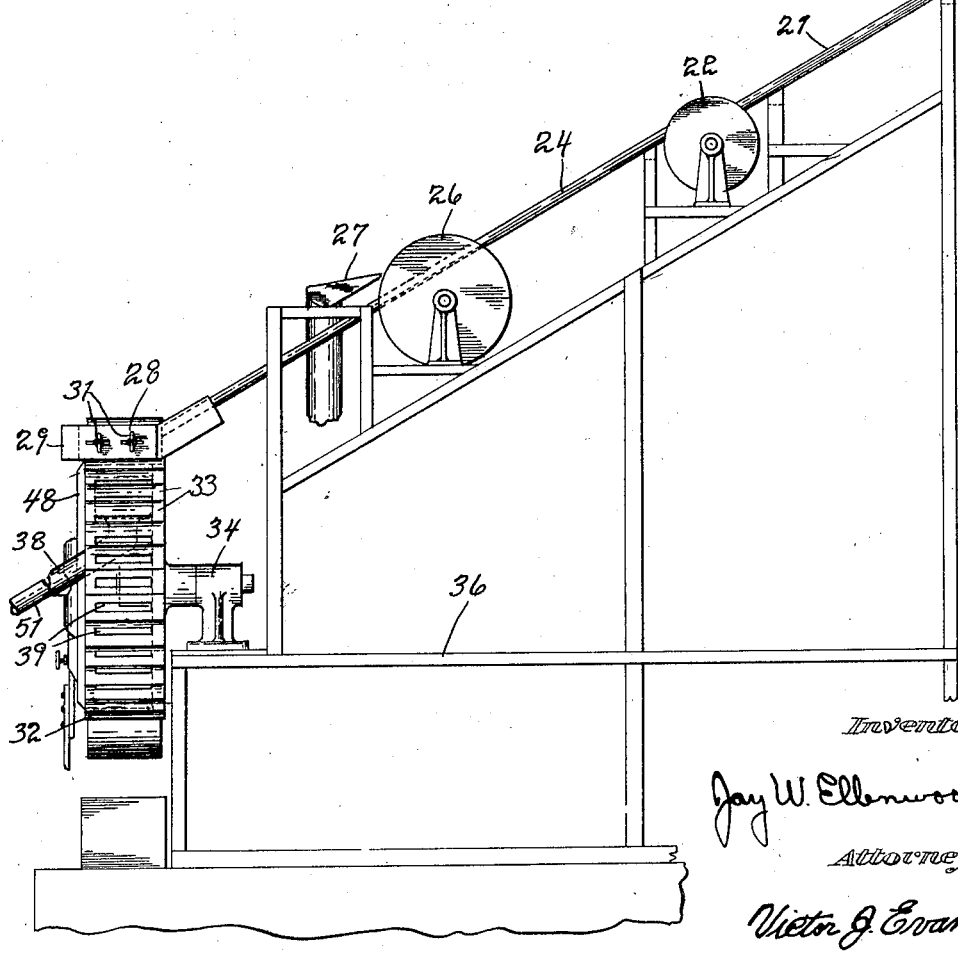
Inventor.
Jay W. Ellenwood
Attorney.
Victor J. Evans Mar. 27, 1923.
J. W. ELLENWOOD
COMBINED FISH GRADING AND CLEANING DEVICE
Filed Oct. 30, 1922    2 sheets-sheet 2
1,450,146
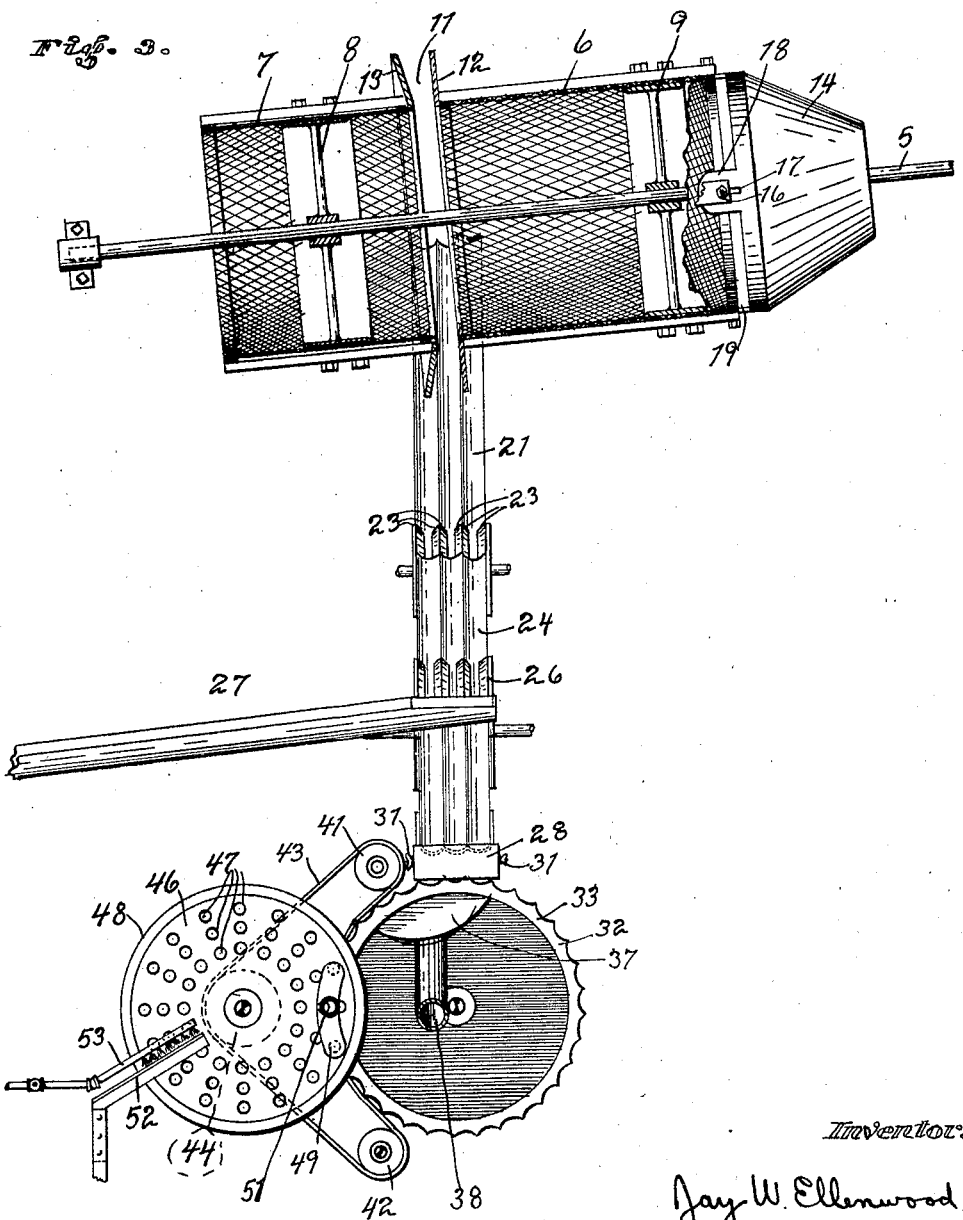

Patented Mar. 27, 1923.

1,450,146

UNITED STATES PATENT OFFICE.

JAY W. ELLENWOOD, OF PACIFIC GROVE, CALIFORNIA.

COMBINED FISH GRADING AND CLEANING DEVICE.

Application filed October 30, 1922. Serial No. 597,954.

*To all whom it may concern:*

Be it known that I, JAY W. ELLENWOOD, a citizen of the United States, residing at Pacific Grove, in the county of Monterey and State of California, have invented new and useful Improvements in Combined Fish Grading and Cleaning Devices, of which the following is a specification.

This invention relates to improvements in combined fish grading and cleaning devices.

The principal object of this invention is to provide a mechanism which will sort fish according to size and remove the heads and entrails automatically.

Another object of this device is to provide grading means whereby absolute uniformity of grading takes place.

Another object is to provide means whereby the fish are automatically cleaned and delivered to a suitable receptacle and all facing in the same direction.

A still further object is to provide a device of this character which is extremely simple in construction, one which will operate rapidly, and one which may be employed with the present canning mechinery.

Other objects and advantages will be apparent during the course of the following description.

In the accompanying drawings forming a part of this specification, and in which like numerals are employed to designate like parts throughout the same, Figure 1 is an end elevation of a grading cylinder, Figure 2 is a cross section of the grading cylinder and the associated parts in end elevation, and Figure 3 is a side elevation of Figure 2, partly in cross section.

In the grading of fish particularly small fish, such as sardines, it is quite essential that the fish be of very uniform size, in order to make a neat looking pack and to also place the required number of fish in each can. It is quite a tedious process at the present time to grade these fish, to remove the heads and entrails as is done with the most select fish.

I propose to accomplish this work automatically by providing a cylinder wherein the fish are caused to move therethrough through the medium of gravity, so that their heads will all project in one direction, deliver the fish from the cylinder to an inclined trough during the course of which too small and too large fish are removed from the trough, and finally placing the fish so selected over a wheel with their heads projecting over the edge thereof, in such a manner that as the wheel revolves the heads contact a rotary knife, which severs the head and further providing means for withdrawing the entrails after the heads have been removed.

I accomplish this object in the following manner, and by referring to Figure 3, it will be noted that I have provided a shaft 5, which is suitably journaled and adapted to have mounted thereon cylinders 6 and 7. These cylinders are formed of wire so as to provide for the removal of dirt as the cylinders revolve. These cylinders are each supported from the shaft 5 as by means of suitable braces 8 and 9. It will also be noted that these cylinders have their adjacent ends spaced one from the other so as to form a discharge opening 11. Secured to the adjacent ends of the cylinder are annular rings as shown at 12 and 13, the purpose of which will be later seen.

A funnel shaped member 14 is provided, which is adjustably secured to the cylinder 6 as by nuts 16 passing through slots 17 provided in wings 18 formed upon the funnel shaped member 14. The purpose of this construction is to provide a discharge opening 19 which may be adjusted, the purpose of which will be later described.

At 21 I have shown a downwardly projecting trough which is adapted to receive fish from the discharge opening 11 and to convey the same downwardly until they contact grader wheels 22. These grader wheels are provided with inclined surfaces as shown at 23, so as to hold the fish in upright position, while being carried over the periphery of the wheel.

A similar trough 24 extends downwardly from the opposite side of the wheels 22 and from the trough 21 but at a higher elevation with respect to the axis of the wheels. The purpose of this elevation is to allow fish of too small a size to pass entirely off the trough 21 and to drop between the wheels 22 and out into a suitable receptacle, while the larger fish will ride over the periphery of these grader wheels and be discharged onto the trough 24.

A second set of grader wheels 26 are provided which are of a larger diameter than the grader wheels 22. These grader wheels are also spaced further apart so that fish of the proper size will pass therebetween, while fish which are too large to pass therebetween will be raised over the periphery of the wheels and be discharged into a chute 27 and be conveyed to a distant point. The trough 24 continues past the grader wheels 26 and terminates in a discharge box 28. This discharge box is provided with a movable end or gauge 29 as is best shown in Figure 2. The movement of which is controlled through the medium of winged nuts 31, the action of which is well known and needs no further discussion.

Mounted directly below the discharge box 28 is a conveyor wheel 32, the periphery of which is provided with a fluted surface as shown at 33 and is journaled in a bracket 34 mounted upon a suitable standard which forms a part of the entire support of my device and is designated by the numeral 36. This conveyor wheel 32 is formed hollow so as to have mounted therein a suction cup 37, which is connected through the medium of a pipe 38 to a suitable vacuum.

Orifices 39 are provided in the fluted portions 33 so that the suction cup 37 can transmit its vacuum through the periphery of the conveyor wheel.

An idler 41 is mounted adjacent the end of the delivery box while an idler 42 is mounted at a point below the wheel 32 so that a belt 43 passing over these idler wheels will contact the periphery of the conveyor wheel 32 for a considerable distance. This belt also passes over a pulley 44 to which a disc 46 is secured. This disc is provided with a series of orifices as shown at 47 and is further provided with a knife edge 48. This disc is positioned so as to be in line with the margin of the conveyor wheel 32 as is best shown in Figure 2.

A vacuum cup 49 has its face in close proximity to the disc 46 and has secured thereto a pipe 51 which pipe is connected to a suitable source of vacuum.

The operation of my device is as follows:—

Fish to be graded are introduced into a funnel 14 in any convenient manner as with a scoop or by means of a suitable conveyor. The fish then move into the cylinder 6, while a part of the refuse, such as sea weed, small stones and the like will drop through the discharge opening 19 and as the fish proceed through the cylinder 6 due to the revolving of the shaft 5, the fish owing to their form will adjust themselves so that their heads will all point toward the lower end of the cylinder. When the fish reach the discharge opening 11 the fish which can pass through will do so, the heads passing through first and the annular ring keeping the fish from turning before they reach the trough 21. Fish which are too large to pass through this discharge opening 11 will pass on to the cylinder 8 and will be discharged into a suitable receptacle.

The fish reaching the trough 21 will move down the same through gravity and will come into contact with the grader wheels 22, the fish which are too small will pass between the grader wheels and will be dropped into a suitable receptacle, while the fish which are larger than can pass between these grader wheels will be carried over onto the trough 24 and will move downwardly and come into contact with the grader wheels 26. The fish which are small enough will pass between these grader wheels will proceed on down the trough to the discharge box 28, while the fish which are too large to pass between these grader wheels 26 will be carried over the periphery and deposited in the trough 27 and discharged at a remote point. The fish which reach the trough 28 will be held with their heads projecting beyond the margin of the conveyor wheel 32 and will be held against the periphery of the wheel 32 through the medium of the vacuum cup 38 which causes its vacuum to pass through the orifices 39 formed in the face of the conveyor wheel.

As this wheel rotates in a counter clockwise direction the fish will come into contact with the belt 43 and will then be held firmly in contact with the same, even after leaving the region of the vacuum cup 37. As this conveyor wheel continues to rotate the fish will be brought into contact with the rotating cutter 48 which will sever the head. The fish will further be carried along the disc 46 and the vacuum cup 49 will through the medium of the openings 47 in the disc 46 cause the withdrawal of the entrails from the fish, due to the vacuum.

In order to prevent the openings 47 from clogging I provide a scraper 52 and a jet 53 of water which serve to keep the surface of the disc at all times clean. It will thus be seen that I have provided a very simple device which will efficiently grade fish accurately, speedily and finally deliver the fish sorted, beheaded and cleaned.

It is to be understood that the form of my invention herewith shown and described is to be taken as a preferred example of the same, and that various changes relative to the shape, size and arrangement of parts may be resorted to without departing from the spirit of the invention or the scope of the subjoined claims.

Having thus described my invention, I claim:—

1. In a device of the character described, a rotating cylinder adapted to receive fish therein, a discharge opening formed in said cylinder, a trough adapted to receive fish from said discharge opening, grading means throughout the length of said trough and means at the end of said trough for holding and severing the heads of the fish conveyed thereto.

2. In a device of the character described, a cylinder comprising two sections spaced one from the other, an annular ring secured to each of said sections at their adjacent ends, said ring forming an elongated discharge opening, grading means located so as to receive fish from said cylinders, a conveyor wheel adapted to receive fish from said grading means, and means for severing the head of the fish while being held in contact with said conveyor means.

3. In a fish grading and cleaning device an inclined shaft, cylinders mounted on said shaft and adapted to rotate therewith, means for discharging fish from said cylinders so that said fish will head in one direction, a trough adapted to receive said fish from said cylinder, grader wheels spaced one from the other and adapted to allow small fish to pass therebetween and to lift larger fish over their periphery, a second trough adapted to receive larger fish, a second set of grader wheels of larger diameter than said first mentioned grader wheels, said second mentioned grader wheels being adapted to allow small fish to pass therebetween and to lift larger fish over their periphery, means for discharging the larger fish at a remote point, a discharge box adapted to receive the smaller fish from said trough and to stop their movement at a predetermined point and means for severing the heads of said fish.

4. In a fish grading and cleaning device an inclined shaft, cylinders mounted on said shaft and adapted to rotate therewith, means for discharging fish from said cylinders so that said fish will head in one direction, a trough adapted to receive said fish from said cylinder, grader wheels spaced one from the other and adapted to allow small fish to pass therebetween and to lift larger fish over their periphery, a second trough adapted to receive larger fish, a second set of grader wheels of larger diameter than said first mentioned grader wheels, said second mentioned grader wheels being adapted to allow small fish to pass therebetween and to lift larger fish over their periphery, means for discharging the larger fish at a remote point, a discharge box adapted to receive the smaller fish from said trough and to stop their movement at a predetermined point, a conveyor wheel mounted beneath said discharge box so as to receive fish therefrom in such a manner that the heads of fish will project over the margin of said wheel, vacuum means for holding the fish in contact with said wheel, a belt adapted to further assist in holding the fish upon said wheel and a rotary knife adapted to sever the heads of the fish, substantially as and for the purpose described.

In testimony whereof I affix my signature.

JAY W. ELLENWOOD.